Jan. 14, 1941.         G. W. EMRICK         2,228,622
CLUTCH MECHANISM
Filed July 11, 1939
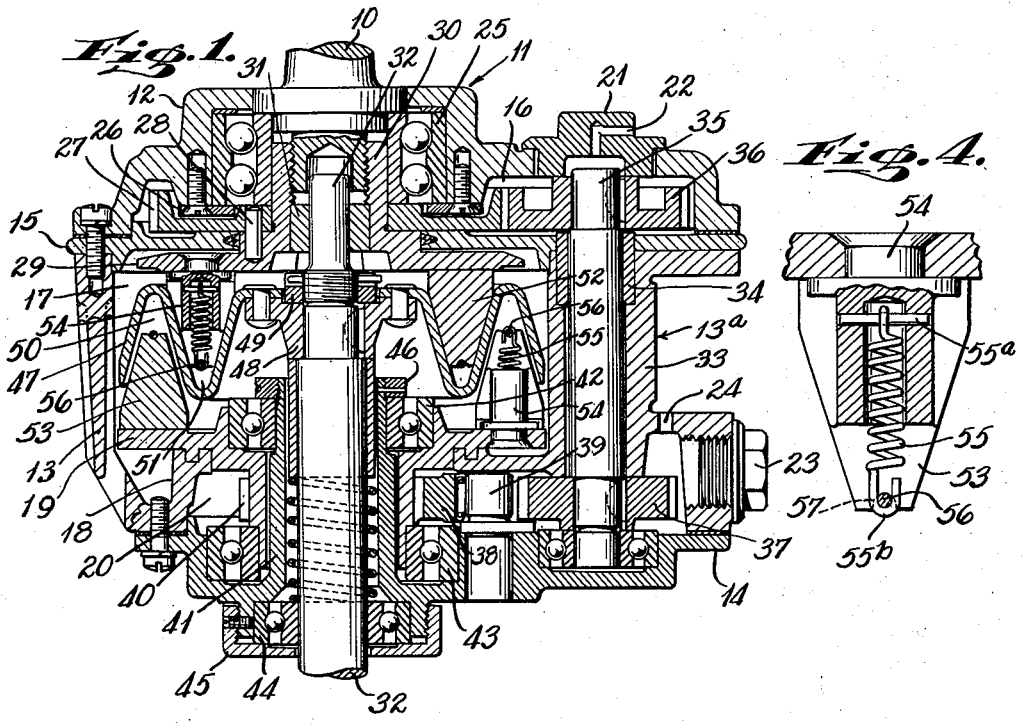
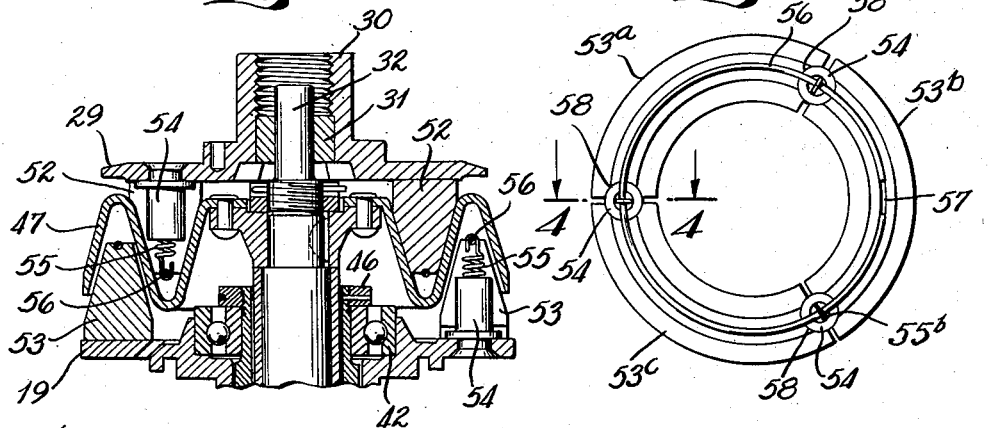
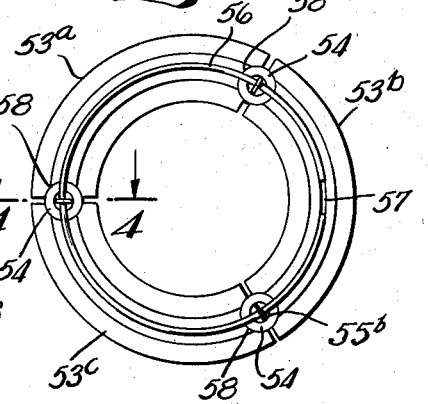
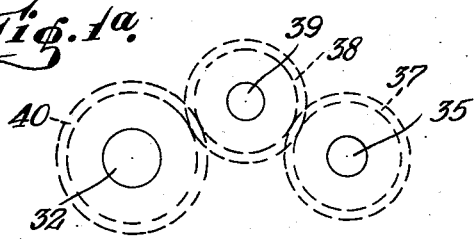
INVENTOR
GEORGE W. EMRICK
BY
ATTORNEY Patented Jan. 14, 1941

2,228,622

UNITED STATES PATENT OFFICE 2,228,622

CLUTCH MECHANISM

George W. Emrick, Brooklyn, N. Y.

Application July 11, 1939, Serial No. 283,761

9 Claims. (Cl. 192—51)

This invention relates to clutch mechanism and particularly to devices of this type and kind as employed, for example, in tapping attachments for providing forward and reverse drive of a tool supporting shaft or spindle; and the object of the invention is to provide a clutch of the character described employing what might be termed a corrugated driving shell, that is to say, a shell having two circumferentially arranged clutch receiving grooves arranged one within the other and opening upwardly and downwardly with respect to the drive shell, each groove being preferably of V-shaped cross sectional form in providing diverging clutch-engaging surfaces for said grooves; a still further object being to provide clutch members preferably of non-metallic material in the form of rings which are subdivided at circumferentially spaced intervals into separate arc-shaped portions, whereby automatic alinement and seating of the rings in each groove of the driving shell is made possible; a still further object being to provide clutch plates having driving pins forming keys for coupling the clutch members therewith with resilient means arranged in the tubular portion of the pins for retaining the arc-shaped clutch sections against displacement from the pins and said clutch plates; and with these and other objects in view, the invention consists in a clutch mechanism of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through a tapping attachment showing my improved clutch mechanism arranged therein.

Fig. 1a is a diagrammatic plan view of a portion of the structure shown in Figure 1.

Fig. 2 is a detail view of the clutch mechanism.

Fig. 3 is a plan view of one of the clutch rings which I employ detached, and

Fig. 4 is an enlarged section on the line 4—4 of Fig. 3 and on an enlarged scale.

The clutch mechanism forming the subject matter of this invention is shown and described generally in a companion application for a patent on a tapping attachment, Serial No. 283,760 filed July 11, 1939. This attachment is shown in Fig. 1 of the drawing simply for the purpose of illustrating one adaptation of my clutch mechanism. This mechanism is adapted for use wherever it is desired to selectively or simultaneously establish driving contact between a clutch plate and opposed clutch members, and it will be understood that I do not limit myself to the particular adaptation of my improved clutch structure which is shown in the drawing.

In the drawing, 10 represents the drive spindle which protrudes beyond the casing or housing 11 for attachment to a suitable source of driving power. The casing or housing 11 is formed of a top cover part 12, a main casing part 13, a bottom cover part or casing 14 and a partitioning plate part 15. The latter subdivides an upper gear chamber 16 from the clutch chamber 17, whereas an extension 18 on the main casing part 13 cooperates with a reverse drive clutch supporting plate 19 in forming another gear chamber 20 which is subdivided and sealed from the chamber 17. The purpose of this construction is to prevent lubricant, preferably in the form of a grease, which is placed in each of the chambers 16, 20, from entering the chamber 17. The grease is introduced into the chamber 16 through a detachable plug 21 having a vent 22 therein, whereas grease is admitted into the chamber 20 through a plug 23 mounted in an extension 13a of the casing, a vent 24 being also provided to the chamber 20, as clearly seen in Fig. 1.

A ball bearing 25 is arranged in the part 12, it being held therein by a retaining plate 26. Freely rotatable in the bearing 25 is a drive gear 27 keyed as seen at 28 to a clutch supporting plate 29 which is provided with a sleeve portion 30 into which the spindle 10 is threaded. A bushing 31 is arranged in the sleeve 30 to form a guide for the upper reduced end portion of a driven spindle 32 as will be apparent.

The extension 13a has a cylindrical portion 33 in the upper portion of which is arranged a bronze bushing 34 to seal and guide a supplemental shaft 35 therein, a gear 36 being secured to the upper end of the shaft 35, and this gear meshes with the gear 27. A gear 37 is secured to the lower end of the shaft 35 and meshes with a pinion 38 arranged upon a stub shaft 39 in the case part 14. The pinion 38 also meshes with a gear 40 which is freely rotatable upon an upwardly extending sleeve portion 41 on the case part 14 and forms, in the construction shown, part of the clutch supporting plate 19. The plate 19 has a ball bearing mounting 42 on the inner end of the sleeve 41, another ball bearing mounting 43 being provided for the plate 19 in the casing part 14. The shaft 32 has a ball bearing mounting as at 44 in the lower portion of the case part 14, the bearing being held in place by a cap 45.

It will appear that the extension 18 of the casing 13 has a tongue and groove connection with the clutch plate 19 in forming the seal between the chamber 20 and the chamber 17.

A nut 46 is arranged upon the inner end of the sleeve 41 to retain the bearing 42 in position.

A double circumferentially grooved driving clutch shell 47 is arranged within the chamber 17, being supported centrally on a sleeve hub portion 48 to which it is secured, the latter being keyed to the shaft 32 and held against displacement thereon by a nut 49. In mentioning the double grooved shell, one might say that the shell is of corrugated cross sectional form to provide a downwardly opening annular channel 50 at the periphery of the shell and an upwardly directed channel 51 inwardly of said first named channel. Both channels are of V-shaped cross sectional form to provide outwardly diverging surfaces in connection with which clutch rings of corresponding cross sectional form are adapted to seat. The upper or forward drive clutch ring is shown at 52, whereas the lower or reverse drive ring is shown at 53. These clutch rings are preferably composed of fibrous heat material, such for example as an asbestos base brake material.

A plan view of one of the rings, for example the ring 53 is shown detached in Fig. 3 of the drawing, from which figure it will be noted that the ring is divided into three sectional parts 53a, 53b, and 53c. Adjacent ends of the parts envelope sleeve-like studs 54 secured to the plate 19 within the base of which are secured coil springs 55 (as seen at 55a in Fig. 4), the upper ends 55b of which are hooked over a split ring 56 seating in an upper grooved portion 57 on the ring 53 of the separate parts or sections thereof. As each clutch ring is of the same construction, the brief description as applied to one will be readable on both, the same reference numerals being applied.

It will be noted, that slight clearance is allowed between the clutch sections and the studs by forming the grooves 58 in the clutch sections slightly larger than the studs 54. This is important to provide for the expansion and contraction of the clutch sections while in use. This construction will permit free independent seating of the separate ring sections in the grooves 50, 51 of the driving shell 47, thus providing a very firm and positive drive of both clutches through the shell or to the shell in the forward and reverse drives of the clutch mechanism, while at the same time providing for slippage if excessive stresses or strains should prevail. It is to be understood in this connection, however, that one of the main objects of my invention resides in the provision of a clutch mechanism which will provide for the high speed drive of a tool or other member when subjected to heavy loads, for example in the operation of the larger types of tools.

It will also appear from the use of the invention as disclosed in Fig. 1 of the drawing, that the reverse drive of the tool; that is to say in drawing a tap out of the workpiece, the tool is operated in the largest diameter of the drive shell, whereas in the forward or direct drive of the tool, the shell is driven through the innermost groove through the smaller diameter ring 52.

The drive shell 47 is normally supported in engagement with the direct drive clutch 52 by a spring, as clearly shown in Fig. 1. This engagement is intensified by the downward pressure of the entire device when feeding a tool, such for example as a tap, into a workpiece. When the pressure is reversed and the device raised to remove the tool from the workpiece, the shell 47 remains stationary with the result that the shell is disengaged from the clutch 52 and engages the reverse drive clutch 53. The reverse drive clutch 53 being constantly rotated in the reverse direction through the reverse gear mechanism, operates to rotate the tool in the reverse direction, thereby withdrawing the tool from the workpiece. When the tool is clear of the workpiece, the drive shell 47 is again moved by the action of the spring into the normal position of engagement with the clutch 52.

It will of course be apparent that the forward drive is direct from the spindle 10 to the shaft 32, whereas in the reverse drive, the clutch plate 19 is actuated through the gears employed and the spindle shaft 35. It will also be apparent that other forms of clutch drive plates may be provided in adapting the clutch mechanism to other types and kinds of apparatus or devices, the present illustration being simply to show the adaptation thereof to the tapping attachment which is herein briefly described.

Having fully described my invention, what I claim as new and desire to secure by Letters Patent is:

1. In a clutch mechanism of the class described having forward and reverse drive clutch members, a clutch shell having an inner circumferential groove and an outer circumferential groove, the first named groove opening one side of the shell and the latter groove at the opposite side thereof, the walls of each groove diverging outwardly at the sides of the shell, a unitary portion of the shell being common to and forming one diverging wall of each groove, said shell being fixedly secured to a member to be driven, and said shell and member being axially movable to selectively engage said grooves with said forward and reverse drive clutch members.

2. A clutch mechanism of the class described comprising two clutch plates, each having a plurality of circumferentially spaced driving studs, a plurality of arc-shaped ring sections arranged on each plate with adjacent ends of the sections keyed to said studs to form substantially continuous circumferential clutch rings, resilient means yieldably supporting the ring sections in connection with said plates and studs, a clutch shell disposed intermediate said clutch rings, said shell having an inner circumferential groove engaging one of the clutch rings and an outer circumferential groove for engagement with the other clutch ring, said grooves opening at opposed surfaces of said shell.

3. A clutch mechanism of the class described comprising two clutch plates, each having a plurality of circumferentially spaced driving studs, a plurality of arc-shaped ring sections arranged on each plate with adjacent ends of the sections keyed to said studs to form substantially continuous circumferential clutch rings, resilient means yieldably supporting the ring sections in connection with said plates and studs, a clutch shell disposed intermediate said clutch rings, said shell having an inner circumferential groove engaging one of the clutch rings and an outer circumferential groove for engagement with the other clutch rings, said grooves being concentrically arranged and opening at opposed surfaces of said shell, said grooves and rings being substantially V-shaped in cross sectional form, and a unitary annular portion of the shell forming one wall of each of the grooves therein.

4. In a clutch of the class described, a clutch member comprising a plate having a plurality of studs projecting from one surface thereof, a plurality of arc-shaped clutch sections disposed on said surface of the plate with adjacent ends of the sections abutting said studs to form a substantially circumferentially continuous ring on said surface of the plate, inner and outer circumferential walls of the ring being inclined toward each other imparting a substantially V-shaped cross sectional contour to said ring, and means coupled with said studs and said sections for yieldably supporting the sections upon the plate thereby providing independent movement and self-alinement of the sections in a clutch shell engaged thereby.

5. In a clutch of the class described, a clutch member comprising a plate having a plurality of studs projecting from one surface thereof, a plurality of arc-shaped clutch sections disposed on said surface of the plate with adjacent ends of the sections abutting said studs to form a substantially circumferentially continuous ring on said surface of the plate, inner and outer circumferential walls of the ring being inclined toward each other imparting a substantially V-shaped cross sectional contour to said ring, means coupled with said studs and said sections for yieldably supporting the sections upon the plate for independent movement in providing self-alinement of the sections in a clutch shell engaged thereby, said last named means comprising a split ring seating in a groove in the outer end of said sections, and coil springs coupled with said split ring and mounted in tubular portions of said studs.

6. In a clutch of the class described, a clutch member comprising a plate having a plurality of studs projecting from one surface thereof, a plurality of arc-shaped clutch sections disposed on said surface of the plate with adjacent ends of the sections abutting said studs to form a substantially circumferentially continuous ring on said surface of the plate, inner and outer circumferential walls of the ring being inclined toward each other imparting a substantially V-shaped cross sectional contour to said ring, means coupled with said studs and said sections for yieldably supporting the sections upon the plate for independent movement in providing self-alinement of the sections in a clutch shell engaged thereby, said last named means comprising a split ring seating in a groove in the outer end of said sections, coil springs coupled with said split ring and mounted in tubular portions of said studs, and said ring sections being composed of asbestos brake material.

7. In a clutch of the class described, the combination with an axially movable clutch shell having concentrically arranged circumferential clutch receiving grooves opening at opposed surfaces of the shell, of small and large diameter clutch members, each member comprising a series of yieldably supported arc-shaped sections which collectively form a ring-like clutch for free engagement with the clutch grooves of said shell.

8. A clutch of the class described comprising two clutch rings composed of fibrous heat resistant material, said rings being arranged one within the other in spaced relation, means coupling the rings to independent supports, a clutch shell disposed intermediate said rings, said rings having beveled inner and outer surfaces forming a substantially V-shaped cross sectional contour, said shell having concentrically arranged circumferential grooves of V-shaped cross sectional form, said grooves opening at opposite sides of said shell in alinement with said rings, the spacing of said rings being sufficient to prevent simultaneous engagement of said shell with both of said rings, and said shell being axially movable to selectively engage each of said rings.

9. A clutch of the class described comprising two clutch rings, one arranged within the other in spaced relation, means coupling the rings to independent supports, a clutch shell disposed intermediate said rings, said rings having beveled inner and outer surfaces forming a substantially V-shaped cross sectional contour, said shell having inner and outer circumferential grooves of V-shaped cross sectional form with one groove opening outwardly at one side of the shell and the other groove at the other side thereof, means supporting the shell for selective axial movement into engagement with each of said rings, said clutch rings being each subdivided into independent arc-shaped ring sections, said first named means comprising circumferentially spaced alining and retaining members on said supports, and recessed portions on said ring sections, the engagement between said members and recessed portions of said sections providing slight relative movement of said sections with respect to the corresponding supports thereby facilitating proper seating of the sections in said shell grooves.

GEORGE W. EMRICK.